(12) United States Patent
Herrero

(10) Patent No.: US 11,622,271 B2
(45) Date of Patent: Apr. 4, 2023

(54) METHODS AND SYSTEMS FOR ACCESS CONTROL

(71) Applicant: Johnson Controls Tyco IP Holdings LLP, Milwaukee, WI (US)

(72) Inventor: Rolando Herrero, Boca Raton, FL (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 376 days.

(21) Appl. No.: 16/787,954

(22) Filed: Feb. 11, 2020

(65) Prior Publication Data
US 2021/0250766 A1 Aug. 12, 2021

(51) Int. Cl.
*H04W 12/08* (2021.01)
*H04W 12/06* (2021.01)
*H04K 1/02* (2006.01)
*H04L 9/32* (2006.01)
*H04W 12/037* (2021.01)
*H04W 12/108* (2021.01)

(52) U.S. Cl.
CPC .............. *H04W 12/08* (2013.01); *H04K 1/02* (2013.01); *H04L 9/3236* (2013.01); *H04W 12/037* (2021.01); *H04W 12/06* (2013.01); *H04W 12/108* (2021.01)

(58) Field of Classification Search
CPC ... H04W 12/08; H04W 12/037; H04W 12/06; H04W 12/108; H04K 1/02; H04L 9/3236; H04L 9/3215; H04L 9/3226; H04L 63/0861; H04L 63/102
See application file for complete search history.

(56) References Cited

U.S. PATENT DOCUMENTS 6,529,871 B1 * 3/2003 Kanevsky ............... G10L 17/24
704/246
7,992,067 B1 * 8/2011 Le Devehat ............ H04L 9/065
375/328

(Continued)

OTHER PUBLICATIONS

Chen et al., "AcousAuth: An acoustic-based mobile application for user authentication", Apr. 2014, IEEE Conference on Computer Communications Workshops, pp. 215-216 (Year: 2014).*

(Continued)

*Primary Examiner* — Kenneth W Chang
(74) *Attorney, Agent, or Firm* — ArentFox Schiff LLP

(57) ABSTRACT

Aspects of the present disclosure include methods, apparatuses, and computer readable media for controlling access including generating a random string or pseudorandom string, acoustically broadcasting a beacon message comprising the random string or pseudorandom string, acoustically receiving, in response to acoustically broadcasting the beacon message, an authentication message comprising a user identification and an authentication string, obtaining a password associated with the user identification, computing a verification string using the password and the random string or pseudorandom string, verifying the authentication string in the authentication message using the verification string, and transmitting, in response to successfully verifying the authentication string in the authentication message, an unlocking message to the access controlled point to unlock the access controlled point.

20 Claims, 10 Drawing Sheets

(56) References Cited

U.S. PATENT DOCUMENTS

| | | | | |
|---|---|---|---|---|
| 2004/0133789 | A1* | 7/2004 | Gantman | G06Q 20/4014 |
| | | | | 713/189 |
| 2011/0047607 | A1* | 2/2011 | Chen | H04L 63/0838 |
| | | | | 726/7 |
| 2014/0068272 | A1* | 3/2014 | Savtchenko | H04L 9/3226 |
| | | | | 713/185 |
| 2014/0359734 | A1* | 12/2014 | Natividad | H04L 9/3226 |
| | | | | 726/6 |
| 2018/0241577 | A1* | 8/2018 | D'Souza | H04L 63/0492 |
| 2019/0047511 | A1* | 2/2019 | Link, II | G07C 9/00309 |

OTHER PUBLICATIONS

Ultrasound Proximity Networking on Smart Mobile Devices for IoT Applications, Ed Novak, Zhuofan Tang, Qun Li, IEEE Internet of Things Journal, vol. ?, No. ?, Jun. 2018.
Naratte's Zoosh enables NFC with jus a speaker and microphone, Devindra Hardawar Jun. 19, 2011 4:00 PM.

* cited by examiner

| Set | 1 | 2 | 3 | 4 | 5 | 6 | 7 | 8 | 9 | 10 | 11 | 12 |
|---|---|---|---|---|---|---|---|---|---|---|---|---|
| A | 17000 | 17200 | 17400 | 17600 | 17800 | 18000 | 18200 | 18400 | 18600 | 18800 | 19000 | 19200 |
| B | 20000 | 20200 | 20400 | 20600 | 20800 | 21000 | 21200 | 21400 | 21600 | 21800 | 22000 | 22200 |

```
┌─────────────────────────────────────────────────┐
│  ACOUSTICALLY RECEIVE, FROM AN ACCESS CONTROL   │
│  DEVICE, A BEACON MESSAGE COMPRISING A RANDOM OR│
│             PSEUDORANDOM STRING                 │
│                      905                        │
└─────────────────────────────────────────────────┘
                        │
                        ▼
┌─────────────────────────────────────────────────┐
│   OBTAIN A USER IDENTIFICATION AND A PASSWORD   │
│            ASSOCIATED WITH THE USER             │
│                      910                        │
└─────────────────────────────────────────────────┘
                        │
                        ▼
┌─────────────────────────────────────────────────┐
│    GENERATE AN AUTHENTICATION STRING USING THE  │
│   PASSWORD AND THE RANDOM OR PSEUDORANDOM       │
│                    STRING                       │
│                      915                        │
└─────────────────────────────────────────────────┘
                        │
                        ▼
┌─────────────────────────────────────────────────┐
│    TRANSMIT, TO THE ACCESS CONTROL DEVICE, AN   │
│   AUTHENTICATION MESSAGE COMPRISING THE USER    │
│   IDENTIFICATION AND THE AUTHENTICATION STRING  │
│                      920                        │
└─────────────────────────────────────────────────┘
```

*FIG. 9*

METHODS AND SYSTEMS FOR ACCESS CONTROL

BACKGROUND

Infrastructures (e.g., buildings, plants, warehouses, laboratories) and/or assets (e.g., safe-deposit boxes, computer devices) may utilize one or more access-controlled points (e.g., a door that requires an access card to enter) to prevent unauthorized people from accessing the infrastructures and/or assets. An authorized person may rely on an access card to enter into an access-controlled infrastructure/asset. However, the access card may have limitations. For example, a proximity card is needed to gain access, which may be misplaced, stolen, or damaged. Traditional access cards may provide limited security that are susceptible to duplication. Further, the physical distance required between an access card and an access control reader for unlocking doors/assets may be small. Therefore, improvements in access control may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

Certain aspects of the present disclosure includes a method for generating a random string or pseudorandom string, acoustically broadcasting a beacon message comprising the random string or pseudorandom string, acoustically receiving, in response to acoustically broadcasting the beacon message, an authentication message comprising a user identification and an authentication string, obtaining a password associated with the user identification, computing a verification string using the password and the random string or pseudorandom string, verifying the authentication string in the authentication message using the verification string, and transmitting, in response to successfully verifying the authentication string in the authentication message, an unlocking message to the access controlled point to unlock the access controlled point.

Some aspects of the present disclosure includes a microphone configured to receive audio input, a speaker configured to emit audio output, a memory comprising instructions a processor communicatively coupled with the memory, the processor being configured to execute the instructions to generate a random string or pseudorandom string, cause the speaker to acoustically broadcast a beacon message comprising the random string or pseudorandom string, cause the microphone acoustically receive, in response to acoustically broadcasting the beacon message, an authentication message comprising a user identification and an authentication string, obtain a password associated with the user identification, compute a verification string using the password and the random string or pseudorandom string, verify the authentication string in the authentication message using the verification string, and transmit, in response to successfully verifying the authentication string in the authentication message, an unlocking message to the access controlled point to unlock the access controlled point.

An aspect of the present disclosure includes a non-transitory computer readable medium having instructions that, when executed by a processor, cause the process to generate a random string or pseudorandom string, cause a speaker to acoustically broadcast a beacon message comprising the random string or pseudorandom string, cause a microphone acoustically receive, in response to acoustically broadcasting the beacon message, an authentication message comprising a user identification and an authentication string, obtain a password associated with the user identification, compute a verification string using the password and the random string or pseudorandom string, verify the authentication string in the authentication message using the verification string, and transmit, in response to successfully verifying the authentication string in the authentication message, an unlocking message to the access controlled point to unlock the access controlled point.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

FIG. 3 illustrates an example of a table showing some carrier frequencies used for communication between the access control device and the mobile device in accordance with aspects of the present disclosure;

FIG. 9 illustrates an example of a method for acoustically requesting access to an access-controlled point in accordance with aspects of the present disclosure.

DETAILED DESCRIPTION

Aspects of the present disclosure may include an access control device that acoustically receives authentication information from a mobile device of a user. In one implementation, the access control device may periodically broadcast random string or pseudorandom strings. The mobile device of the user may receive one of the random string or pseudorandom strings. The mobile device may combine the received random string or pseudorandom string with the authorization information of the user to generate the authentication information for accessing the access control system. The mobile device may acoustically transmit the authentication information to the access control device. Once the authorization information is authenticated by the access control device, the access control device may grant access to the user.

Figure 1:
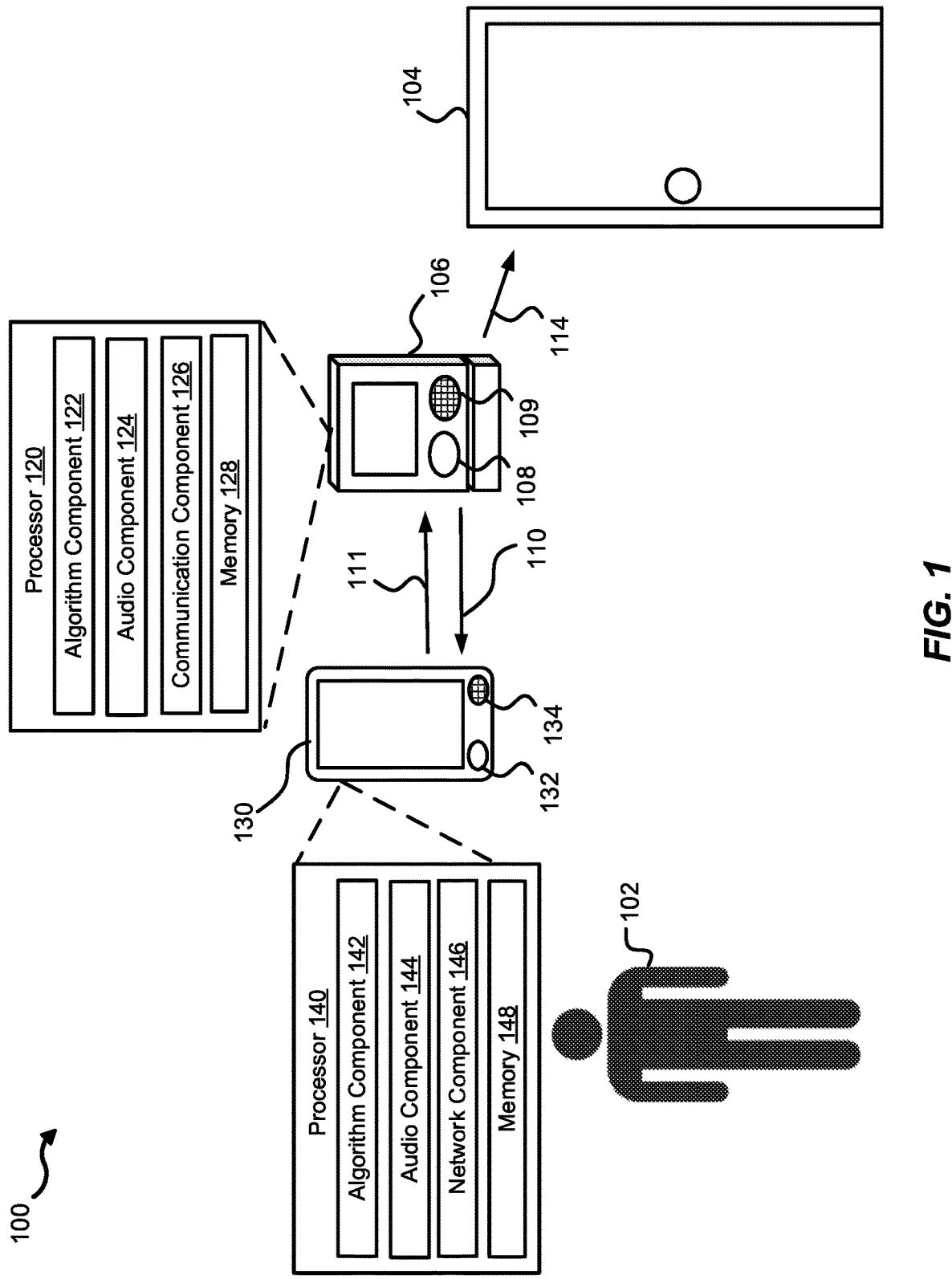
FIG. 1 illustrates an example of an environment for acoustically accessing an access-controlled point in accordance with aspects of the present disclosure.

Turning now to FIG. 1, in certain non-limiting examples, an environment 100 for controlling access may include an user 102 that may utilize a mobile device 130 to gain access to an access-controlled point 104. The environment 100 may include an access control device 106 configured to acoustically transmit/receive audio signals from the mobile device 130. For example, the access control device 106 may acoustically transmit a random string or pseudorandom string to the mobile device 130. In response to the transmission, the access control device 106 may receive an acoustic response including authorization information associated with the user 102. The access control device 106 may grant access to the access-controlled point 104 if the user 102 is permitted to access the access-controlled point 104.

In one implementation, the mobile device 130 may include a processor 140 and a memory 148. The mobile device 130 may include a microphone 132 configured to acoustically receive audio signals. The mobile device 130 may include a speaker 134 configured to acoustically transmit audio signals. The processor 140 may include an algorithm component 142 configured to generate an alphanumeric string based on a random string or pseudorandom string and authorization information. The processor 140 may include an audio component 144 configured to digitize received audio signals and convert digital data into audio signals for transmission. The processor 140 may include a network component 146 (e.g., software code executed by the processor 140) that manages network traffic between the mobile device 130 and the access control device 106. The memory 148 may store instructions executable by the processor 140 to implement various components and subcomponents of the mobile device 130.

In certain implementations, the access-controlled point 104 may be a door/vault that requires an access card to enter or a computer account that requires a password to use. The access-controlled point 104 may be utilized to control access to infrastructures (e.g., buildings, plants, warehouses, laboratories) and/or assets (e.g., safe-deposit boxes, computer account or device). In other examples, the access-controlled point 104 may be a digital lock that restricts access to files, software, databases, information, or other digital data. Other examples of access-controlled points may be possible.

In some aspects of the present disclosure, the access control device 106 may include a processor 120 and a memory 128. The access control device 106 may include a microphone 108 configured to acoustically receive audio signals. The access control device 106 may include a speaker 109 configured to acoustically transmit audio signals. The processor 120 may include an algorithm component 122 configured to generate a random string or pseudorandom string and verify authorization information. The processor 120 may include an audio component 124 configured to digitize received audio signals and convert digital data into audio signals for transmission. The processor 120 may include a communication component 126 that receives and/or transmits data. The memory 128 may store instructions executable by the processor 120 to implement various components and sub-components of the access control device 106.

In some implementations, the environment 100 may include an optional server that stores authorization information associated with users. In optional implementations, the optional server may be configured to verify the authorization information.

During operations, in some aspects, the user 102 may use the mobile device 130 to gain access to the access-controlled point 104. The speaker 109 of the access control device 106 may acoustically transmit a beacon message 110, which includes a random string or pseudorandom string generated by the algorithm component 122 of the mobile device 130, such as $45_{Decimal}$, to the mobile device 130. The algorithm component 122 may include hardware random string generator or software random string generator (e.g., software instructions executed by the processor 120). The audio component 124 (e.g., software instructions executed by the processor 120) of the access control device 106 may use frequency modulation and/or amplitude modulation to represent a random string or a pseudorandom string, such as the number $45_{Decimal}$. For example, a random string or pseudorandom string of $45_{Decimal}/00101101_{Binary}$ may be transmitted, by the speaker 109 via frequency modulation, as a sequence of low frequency (LF) and/or high frequency (HF) sounds. Specifically, the number $45_{Decimal}/00101101_{Binary}$ may be LF-LF-HF-LF-HF-HF-LF-HF. In another example, the number $45_{Decimal}/00101101_{Binary}$ may be transmitted by the speaker 109 via amplitude modulation as a sequence of low amplitude (LA) and/or high amplitude (HA) sounds. Specifically, the number $45_{Decimal}/00101101_{Binary}$ may be LA-LA-HA-LA-HA-HA-LA-HA. The frequency may range from 10 hertz (Hz) to 20 megahertz (MHz). In other examples, the frequency may range from 20 Hz to 25 kilohertz (kHz). Other portions of the beacon message 110 may also be acoustically modulated. Other modulation techniques may be possible.

In some implementations, a random string or pseudorandom string, text sequence, alphanumeric string, etc., may be used.

In one aspect of the present disclosure, the microphone 132 of the mobile device 130 may acoustically receive the beacon message 110. For example, the microphone 132 may detect the beacon message 110 including a frequency modulated sequence of LF-LF-HF-LF-HF-HF-LF-HF or an amplitude modulated sequence of LA-LA-HA-LA-HA-HA-LA-HA. The audio component 144 (e.g., software instructions executed by the processor 120) of the mobile device 130 may demodulate the frequency modulated sequence in the beacon message 110 (i.e., LF-LF-HF-LF-HF-HF-LF-HF) as $00101101_{Binary}$, or equivalently $45_{Decimal}$. Alternatively, the audio component 144 of the mobile device 130 may demodulate the amplitude modulated sequence in the beacon message 110 (i.e., LA-LA-HA-LA-HA-HA-LA-HA) as $00101101_{Binary}$, or equivalently $45_{Decimal}$. The algorithm component 142 may generate an authentication message 111 using the random string or pseudorandom string, such as the number $45_{Decimal}/00101101_{Binary}$, in the beacon message 110 and authorization information. For example, the authentication message 111 may include a user identification (e.g., user name, user ID, etc.) of the user 102 and/or an alphanumeric string generated using the number $45_{Decimal}/00101101_{Binary}$ and a password associated with the user 102. In one example, the algorithm component 142 (e.g., implemented by the processor 140 executing software instructions) may use a hash function to generate the alphanumeric string (e.g., an MD5 hash function taking the password of the user 102 and the number $45_{Decimal}/00101101_{Binary}$ as inputs and generating a 128-bit binary sequence). The algorithm component 142 may be implemented via instructions executed by the processor 140.

In an implementation, the audio component 144 of the mobile device 130 may acoustically modulate the authentication message 111 into an acoustic signal. For example, the authentication message 111 may be a 256-bit binary sequence, such as $1_0$-$1_1$-$0_2$- ... $1_{255}$. The subscripts indicate the bit position in the binary sequence. The audio component 144 may modulate the 256-bit binary sequence (e.g., $1_0$-$1_1$-$0_2$ ... $1_{255}$) into a frequency modulated sequence of [frequency$_0$-frequency$_1$-frequency$_2$- ... frequency$_{255}$], where each frequency$_n$ may be a high frequency (representing a binary "1") or a low frequency (representing a binary "0"). In other words, the frequency modulated sequence is $HF_0$-$HF_1$-$LF_2$- ... $HF_{255}$. Amplitude modulation or other types of acoustic modulations may also be used.

In some implementations, the speaker 134 of the mobile device 130 may acoustically transmit the authentication message 111 to the access control device 106. For example, the speaker 134 may acoustically transmit the frequency modulated sequence of $HF_0$-$HF_1$-$LF_2$-$HF_{255}$.

In some instances, the microphone 108 of the access control device 106 may receive the frequency modulated sequence (i.e., $HF_0$-$HF_1$-$LF_2$- ... $HF_{255}$) of the authentication message 111. The audio component 124 of the access control device 106 may demodulate the authentication message 111 to extract the authorization information. For example, the audio component 124 may demodulate the frequency modulated sequence of $HF_0$-$HF_1$-$LF_2$- ... $HF_{255}$ (detected by the microphone 108) into $1_0$-$1_1$-$0_2$- ... $1_{255}$.

In a non-limiting implementation, the algorithm component 122 of the access control device 106 may authenticate the authorization information. The algorithm component 122 may identify the password associated with the user 102 using the user identification of the user 102. The algorithm component 122 may use the same hash function used by the mobile device 130 to generate a new 128-bit binary sequence. In one example, the algorithm component 122 may use the MD5 hash function with the retrieved password of the user 102 and the number $45_{Decimal}$/$00101101_{Binary}$ as inputs to generating the new 128-bit binary sequence. The algorithm component 122 may compare the new 128-bit binary sequence with the 128-bit sequence obtained from the demodulated sequence of $HF_0$-$HF_1$-$LF_2$- ... $HF_{255}$. If the two sequences are identical, then the communication component 126 of access control device 106 may transmit an unlocking message 114 to the access-controlled point 104 to allow the user 102 access to the access-controlled point 104. If the two sequences are different, then the communication component 126 may not take any action and the access-controlled point 104 remains locked. The communication component 126 may be implemented as instructions executed by the processor 120.

In one implementation, the acoustic power of the speaker 134 and/or the speaker 109 may be adjusted by the processors 140, 120, respectively, to change the detection distance between the mobile device 130 and the access control device 106.

Figure 2:
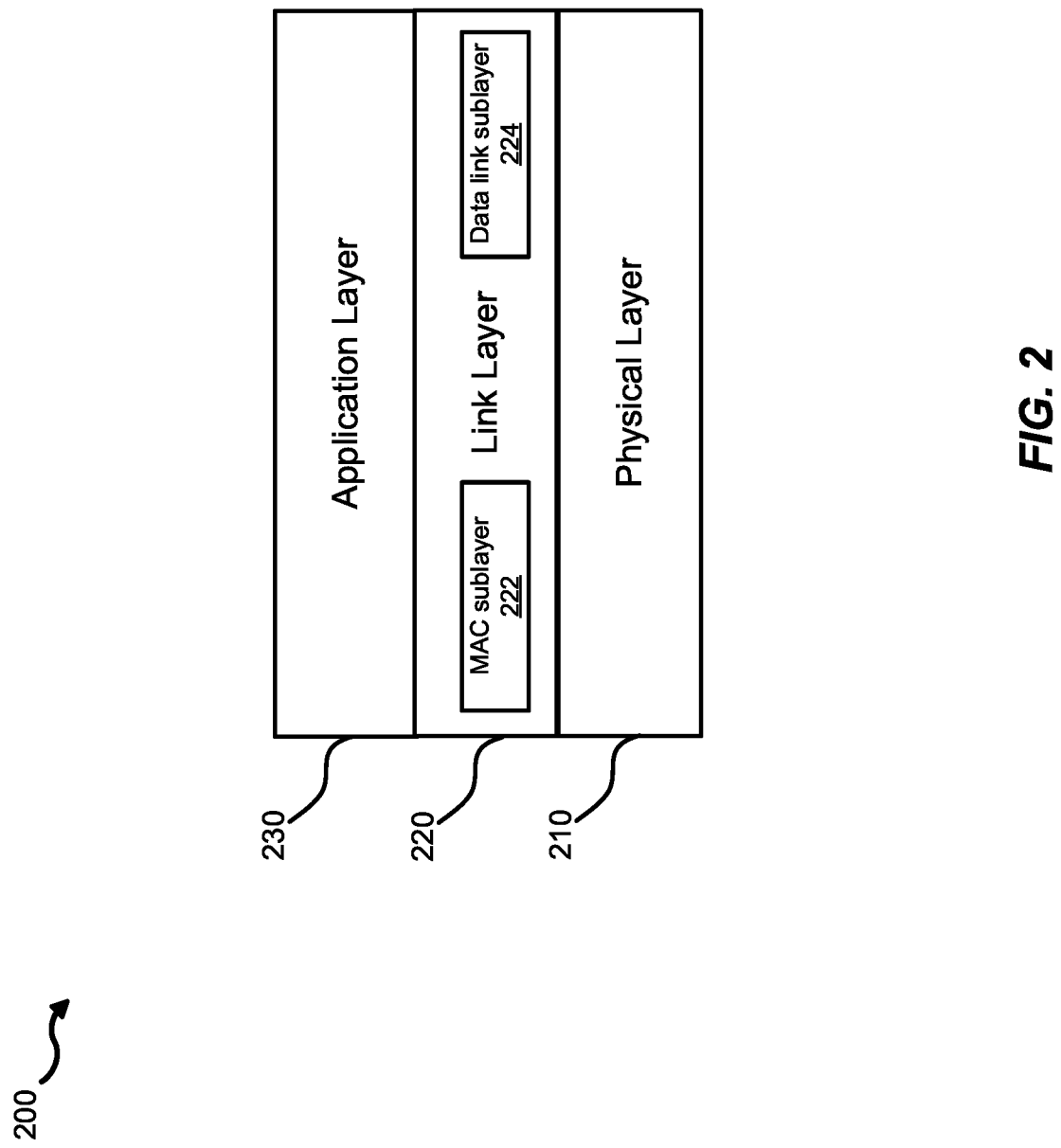
FIG. 2 illustrates an example of a communication architecture in accordance with aspects of the present disclosure.

Turning to FIG. 2, an example of a communication architecture 200 between the access control device 106 and the mobile device 130 may include at least some layers of the Open Systems Interconnection (OSI) model. In one example, the communication architecture 200 may include a physical layer 210 that provides source encoding and decoding via ultrasonic modulation and demodulation, respectively. The communication architecture 200 may include a link layer 220 that coordinates the interaction between the access control device 106 and the mobile device 130 to prevent contention (via a media access (MAC) sublayer 222) and/or defines the frame format (via a data link sublayer 224). The communication architecture 200 may include an application layer 230 that provides the message flow for user authentication. Other layers and/or combinations of layers in the OSI model may be implemented.

Turning now to FIG. 3 and referencing FIG. 2, an example of a table 300 showing some carrier frequencies used for communication between the access control device 106 and the mobile device 130 in the physical layer 210. In one example, the physical layer 210 may rely on Frequency Division Multiple Access (FDMA) where the ultrasonic spectrum is divided into two sets (A and B) each with 12 sub-channels in which Binary Frequency Shift Keying (BFSK) is performed. The BFSK mechanism may include transmitting a carrier when modulating a binary one and/or temporarily suspend the transmission of the carrier when modulating a zero. For example, the number $45_{Decimal}$/$00101101_{Binary}$ may be modulated, when selecting Set A and sub-channel 4, as nothing-nothing-carrier(17.6 kHz)-nothing-carrier(17.6 kHz)-carrier(17.6 kHz)-nothing-carrier (17.6 kHz). The table 300 shows the carrier frequencies (in Hz) for each of the 12 sub-channels. In other examples, different numbers of sub-channels and modulation techniques, such as quadrature amplitude modulation (QAM), quadrature phase shift keying (QPSK), phase shift keying (PSK), amplitude shift keying (ASK), frequency shift keying (FSK), continuous phase modulation (CPM) for example, may be used for communication between the control device 106 and the mobile device 130. Other techniques may be used.

In an implementation, the access control device 106 may modulate the digital signals using Set A and demodulate the acoustic signals from the mobile device 130 using Set B. The mobile device 130 may modulate the digital signals using Set B and demodulate the acoustic signals from the access control device 106 using Set A. Other combinations may be possible.

In some implementations, the access control device 106 may utilize a first sub-channel (e.g., sub-channel 7) when communicating with a first mobile device and a second sub-channel (e.g., sub-channel 12) when communicating with a second mobile device.

Figure 4:
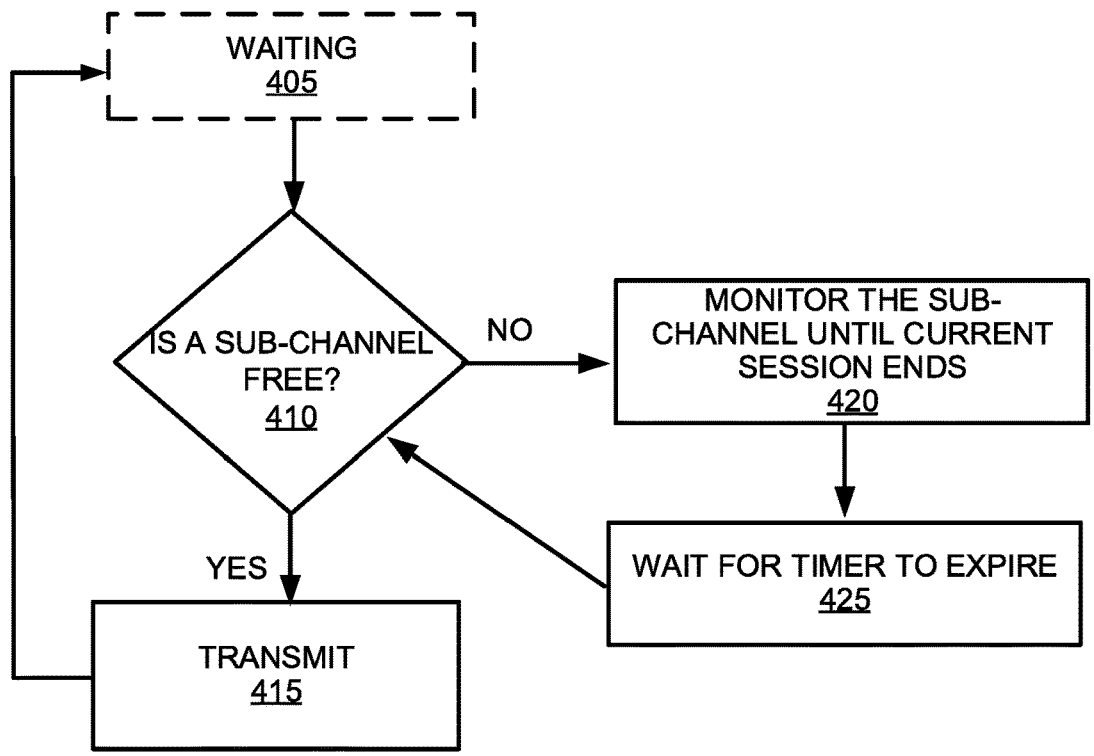
FIG. 4 illustrates an example of a method for resolving channel collision in accordance with aspects of the present disclosure.

Turning now to FIG. 4 and referencing FIGS. 2 and 3, an example of a method 400 for resolving channel collision may be provided in the MAC sublayer 222 of the link layer 220. The method 400 may allow multiple mobile devices to communicate with a single access control device.

At block 405, the method 400 may optionally wait 405. For example, the mobile device 130 may wait until data needs to be transmitted.

At block 410, the method 400 may determine whether a sub-channel is free. For example, the network component 146, the processor 140, and/or the microphone 132 may determine whether the sub-channel 5 of the Set B is free. In one example implementation, the microphone 132 may monitor the sub-channel 5 of the Set B. If the microphone 132 does not detect acoustic signals at 20.8 kHz, the network component 146 may determine that the sub-channel 5 is free. If the microphone 132 does detect acoustic signals at 20.8 kHz, the network component 146 may determine that the sub-channel 5 is not free.

At block 415, the method 400 may transmit signals in response to determining that the sub-channel is free. For example, the speaker 134, the network component 146, and/or the processor 140 may transmit messages in response to determining that the sub-channel is free.

At block 420, the method 400 may monitor the sub-channel until a current session ends in response to determining that the sub-channel is not free. For example, the network component 146, the processor 140, and/or the microphone 132 may monitor the sub-channel 5 of the Set B until the current session ends.

At block 425, the method 400 may wait for a timer to expire. For example, the network component 146 and/or the processor 140 may wait for a back-off time to expire. A purpose of the back-off timer is to randomize channel access and prevent device collisions.

Figure 5:
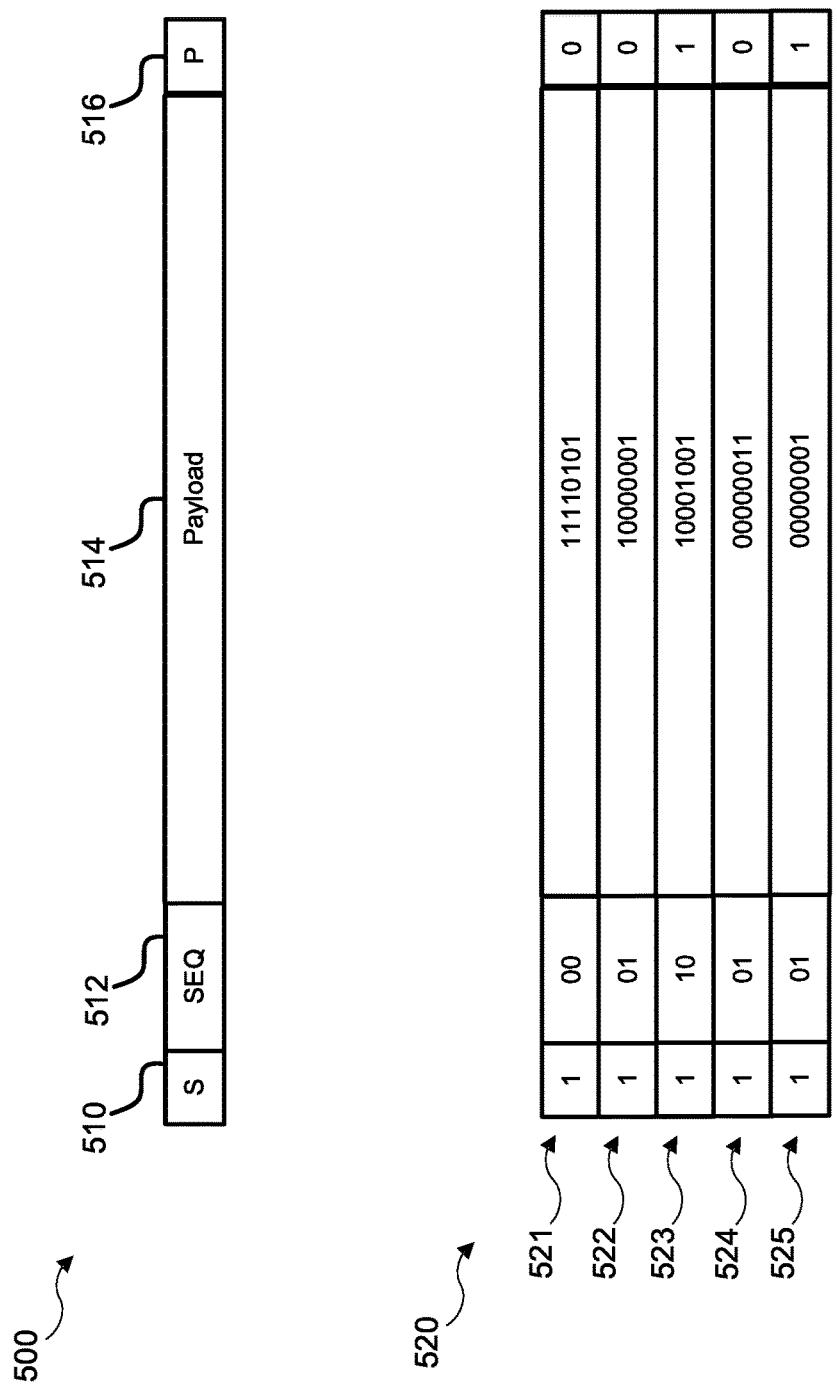
FIG. 5 illustrates an example of a frame in the data link sublayer in accordance with aspects of the present disclosure.

Turning to FIG. 5 and referencing FIGS. 1 and 2, an example of a frame 500 in the data link sublayer 224 may be used for communications between the access control device 106 and the mobile device 130. In one example, the frame 500 may be a 12-bit structure that maps the symbols encoded in the physical layer. The frame 500 may be modulated by one or more frequencies in the Sets A and/or B for the access control device 106 and the mobile device 130, respectively. Higher level messages may be fragmented into multiple frames.

In some implementations, the frame 500 may include a synchronization field 510 that is a 1-bit field used for frame synchronization (e.g., a "1" indicates a valid frame). The frame 500 may include a frame field 512, which is a 2-bit field that identifies the frame 500 within the message (e.g., "00" may indicate the initial frame, "01" and "10" may indicate alternating intermediate frames, and "11" may indicate the final frame). The frame 500 may include a payload field 514 that is an 8-bit fragment of the message. The parity field 516 that is a 1-bit parity derived from the payload and used for error detection by the receiving device.

In a non-limiting aspect of the present disclosure, an example of a message 520 may be a 40-bit message that is fragmented into five frames: a first frame 521, a second frame 522, a third frame 523, a fourth frame 524, and a fifth frame 525. The five frames may be modulated using the Sets A or B modulation schemes. Other frame structures and contents may also be used.

Figure 6:
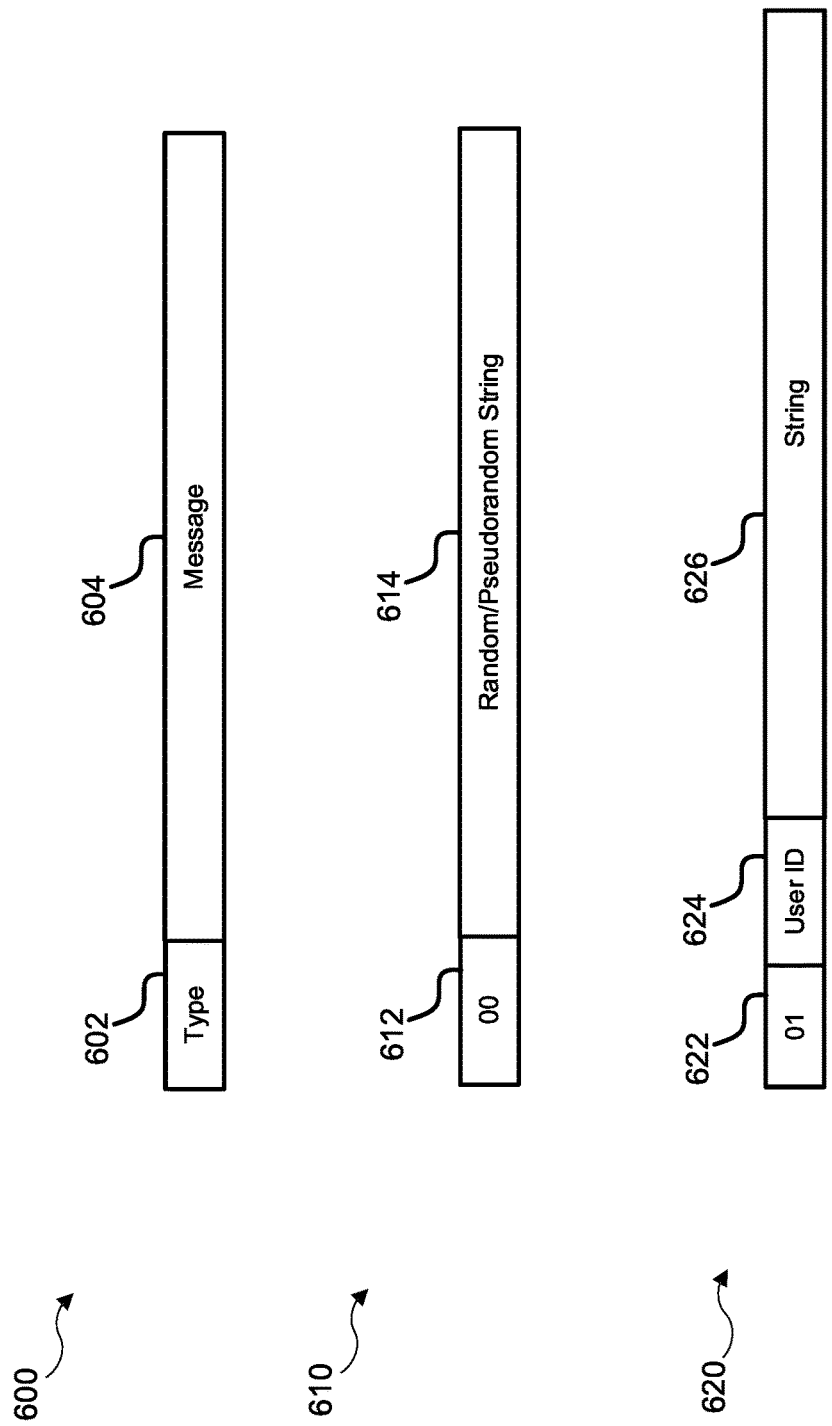
FIG. 6 illustrates an example of a message in the application layer in accordance with aspects of the present disclosure.

Turning to FIG. 6 and referencing FIGS. 1 and 2, an example of a message 600 in the application layer 230 may include a type field 602 and a message field 604. The type field 602 may be a 2-bit field that indicates the type of message: "00" to indicate a beacon message, 01 to indicate an authentication message, 10 and 11 are reserved. The message 600 may include a message field 604 that includes a message to be transmitted.

In some examples, a beacon message 610 (described in more detail below) may include a value 612 of "00" in the type field and a random/pseudorandom string 614 in the message field. The beacon message 610 may be broadcasted by the access control device 106. The random/pseudorandom string 614 may be used (as indicated above) by the mobile device 130 to generate authentication information.

In some examples, an authentication message 620 (described in more detail below) may include a value 622 of "01" in the type field. The authentication message 620 may include a user ID to identify the user 102. The authentication message 620 may include a string generated from the random/pseudorandom string 614 and/or authorization information (e.g., password) associated with the user 102.

Figure 7:
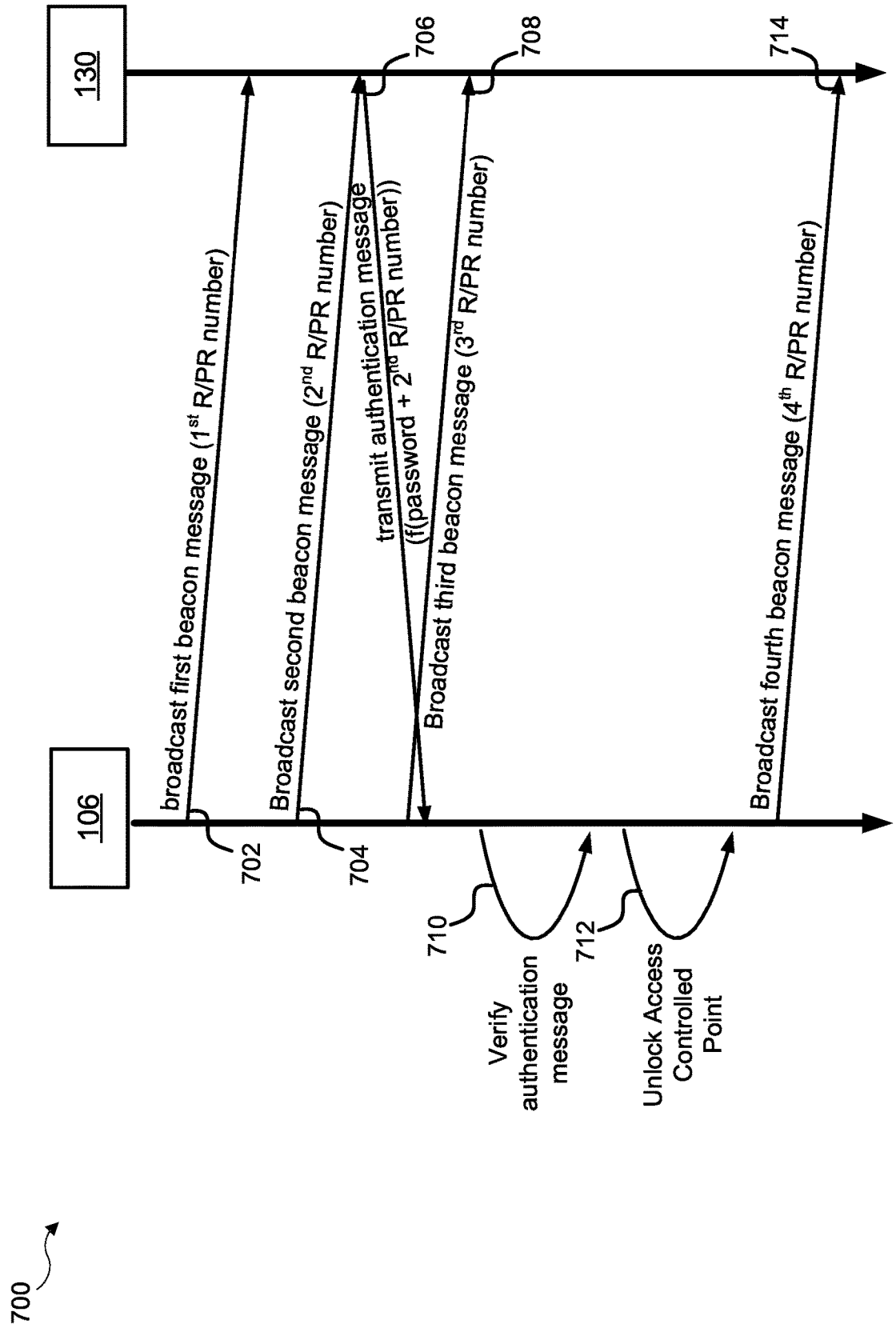
FIG. 7 illustrates an example of a method of implementing acoustic access control in accordance with aspects of the present disclosure.

Turning to FIG. 7, a method 700 of implementing acoustic access control may include the access control device 106 acoustically communicating with the mobile device 130.

At step 702, the access control device 106 may acoustically broadcast a first beacon message having a first random/ pseudorandom (R/PR) number as discussed above.

At step 704, the access control device 106 may acoustically broadcast a second beacon message having a second R/PR number. The access control device 106 may broadcast the second beacon message at a predetermine interval after the first beacon message. In one implementation, the access control device 106 may periodically broadcast beacon messages until receiving a response.

At step 706, the mobile device 130 may acoustically transmit an authentication message in response to receiving the second beacon message as discussed above. For example, the mobile device 130 may perform a hash operation using the second R/PR number in the second beacon message and the password associated the user 102 to generate a string. The authentication message may include a user identification associated with the user 102. The mobile device 130 may receive the second beacon message but not the first beacon message (e.g., not within the reception distance of the first beacon message).

At step 708, the access control device 106 may acoustically broadcast a third beacon message having a third R/PR number.

After step 708, the access control device 106 may receive the authentication message acoustically transmitted by the mobile device 130. After receiving the authentication message, the access control device 106 may suspend the broadcasting of the beacon messages.

At step 710, the access control device 106 may verify the authentication message. For example, the access control device 106 may perform hash operations using the password associated with the user identification, and one of the first, second, or third R/PR number. The access control device 106 may compare the results with the string in the authentication message. If the string matches one of the results, then the authentication message is successfully verified.

At step 712, the access control device 106 may unlock the access control point in response to a successful verification.

During steps 710 and 712, the access control device 106 may suspend the broadcasting of the beacon messages.

At step 714, the access control device 106 may broadcast a fourth beacon message having a fourth R/PR number.

Figure 8:
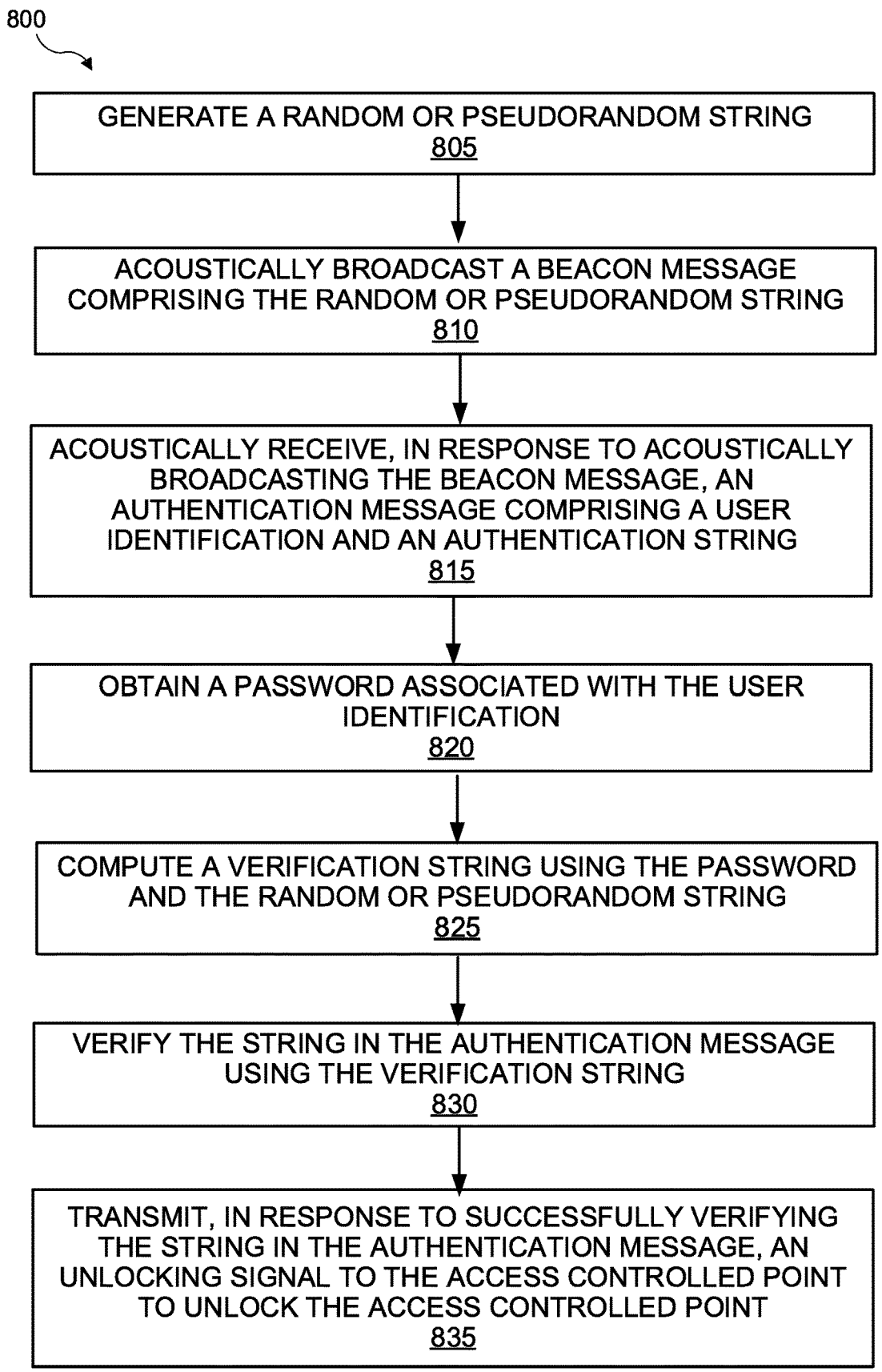
FIG. 8 illustrates an example of a method for controlling an access controlled point in accordance with aspects of the present disclosure.

Turning to FIG. 8, an example of a method 800 for controlling an access controlled point may be performed by the microphone 108, the speaker 109, processor 120, the algorithm component 122, the audio component 124, the communication component 126, and/or the memory 128 of the access control device 106.

At block 805, the method 800 may generate a random string or pseudorandom string. For example, the algorithm component 122 of the access control device 106 may utilize a hardware generator (e.g., circuit in the processor 120 or the access control device 106) or a software generate (e.g., the processor 120 executing instructions in the memory 128) to generate the random/pseudorandom string 614.

At block 810, the method 800 may acoustically broadcast a beacon message comprising the random string or pseudorandom string. For example, the audio component 124, the processor 120, and/or the speaker 109 may broadcast the beacon message 610 including the random/pseudorandom string 614 as described above.

At block 815, the method 800 may acoustically receive, from a mobile device in response to acoustically broadcasting the beacon message, an authentication message comprising a user identification and an authentication string. For example, the audio component 124, the processor 120, and/or the microphone 108 may receive the authentication message 620 including the user ID 624 and the string 626 as described above.

At block 820, the method 800 may obtain a password associated with the user identification. For example, the communication component 126, the processor 120, and/or the memory 128 may obtain the password associated with the user ID 624. In one example, the communication component 126 may transmit (over a safe communication link such as an encrypted link) the user ID 624 to an external server. The external server may locate the password associated with the user ID 624 and transmit the password back to the communication component 126 of the access control device 106. In alternative implementations, the communication component 126 may retrieve the password associated with the user (e.g., user identified by the user ID 624 from the memory 128).

At block 825, the method 800 may generate a verification string using the password and the random string or pseudorandom string. For example, the algorithm component 122 and/or the processor 120 may compute a verification string by applying a hash function on the password associated with the user ID 624 and the random/pseudorandom string 614.

At block 830, the method 800 may verify the authentication string in the authentication message using the verification string. For example, the algorithm component 122 and/or the processor 120 may compare the verification string and the string 626 to determine if they are identical.

At block 835, the method 800 may transmit, in response to verifying the authentication string in the authentication message, an unlocking message to the access controlled point to unlock the access controlled point. For example, the communication component 126 or the processor 120 may transmit the unlocking message 114 to the access controlled device 104 to unlock the access controlled device.

In some implementations, the method 800 may not perform an action if unable to verify the authentication string in the authentication message. For example, if the algorithm component 122 determines that the string in the authentication message is different than the verification string, then the algorithm component 122 is unable to verify that the user 102 is permitted to access the access-controlled point 104. The access control device 106 may refrain from sending the unlocking message 114 so the access-controlled device 106 remains locked.

Turning to FIG. 9, a method 900 for acoustically requesting access to an access-controlled point may be performed by the microphone 132, the speaker 134, the processor 140, the algorithm component 142, the audio component 144, the network component 146, and/or the memory 150 of the mobile device 130.

At block 905, the method 900 may acoustically receive, from an access control device, a beacon message comprising a random string or pseudorandom string. For example, the microphone 132, the audio component 144, and/or the processor 140 may acoustically receive the beacon message 610 including the random/pseudorandom string 614 as described above.

At block 910, the method 900 may obtain a user identification and a password associated with the user. For example, the algorithm component 142 may obtain the user ID 624 and the password associated with the user 102 from the memory 150.

At block 915, the method 900 may generate an authentication string using the password and the random string or pseudorandom string. For example, the algorithm component 142 may generate the string 626 by performing a hash operation on the password and the random/pseudorandom string 614 as described above.

At block 920, the method 900 may acoustically transmit, to the access control device, an authentication message comprising the user identification and the authentication string.

Figure 10:
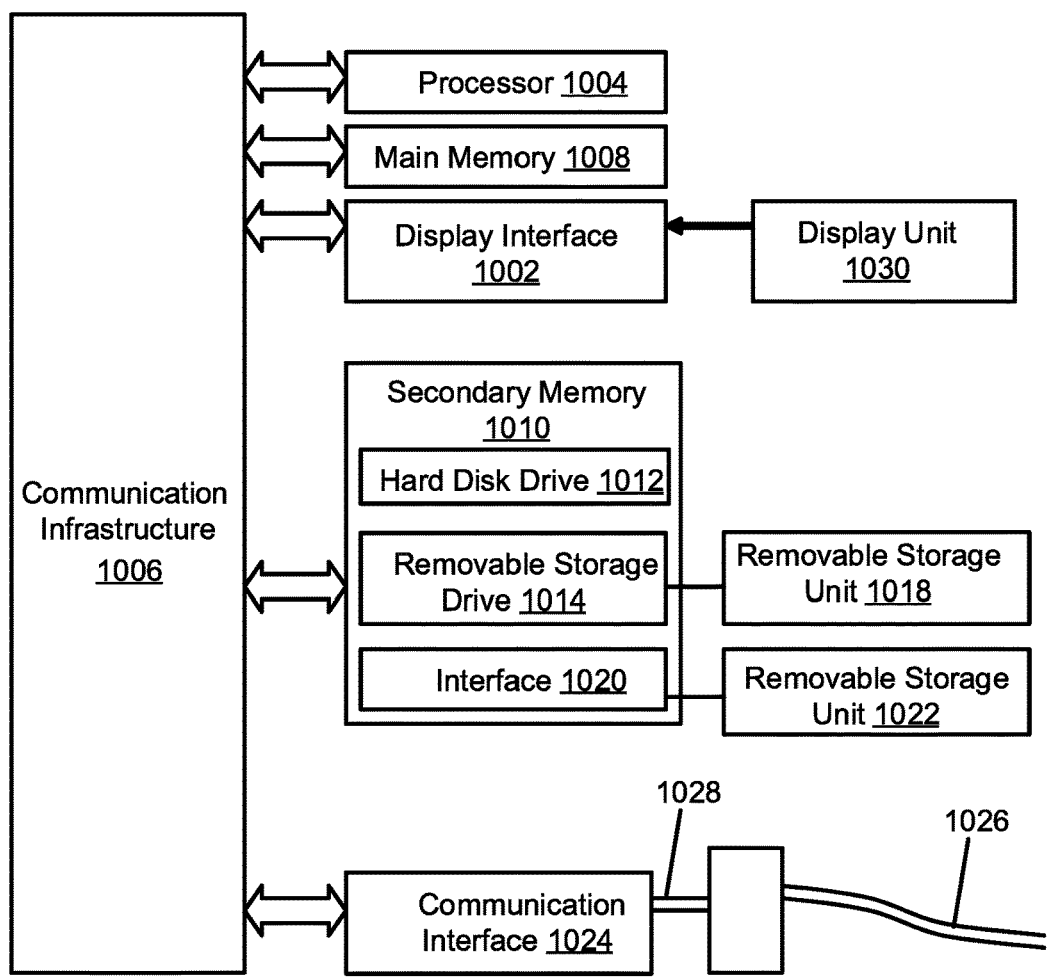
FIG. 10 illustrates an example of a computer system in accordance with aspects of the present disclosure.

Aspects of the present disclosures, such as the access control device 106 and/or the mobile device 130 may be implemented using hardware, software, or a combination thereof and may be implemented in one or more computer systems or other processing systems. In an aspect of the present disclosures, features are directed toward one or more computer systems capable of carrying out the functionality described herein. An example of such a computer system 1000 is shown in FIG. 10. The access control device 106 and/or the mobile device 130 may include some or all of the components of the computer system 1000.

The computer system 1000 includes one or more processors, such as processor 1004. The processor 1004 is connected with a communication infrastructure 1006 (e.g., a communications bus, cross-over bar, or network). The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. Various software aspects are described in terms of this example computer system. After reading this description, it will become apparent to a person skilled in the relevant art(s) how to implement aspects of the disclosures using other computer systems and/or architectures.

The computer system 1000 may include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012, and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., which is read by and written to removable storage drive 1014. As will be appreciated, the removable storage unit 1018 includes a computer usable storage medium having stored therein computer software and/or data. In some examples, one or more of the main memory 1008, the secondary memory 1010, the removable storage unit 1018, and/or the removable storage unit 1022 may be a non-transitory memory.

Alternative aspects of the present disclosures may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, an RF link and/or other communications channels. In this document, the terms "computer program medium" and "computer usable medium" are used to refer generally to media such as a removable storage drive 1018, a hard disk installed in hard disk drive 1012, and signals 1028. These computer program products provide software to the computer system 1000. Aspects of the present disclosures are directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present disclosures, as discussed herein. In particular, the computer programs, when executed, enable the processor 1004 to perform the features in accordance with aspects of the present disclosures. Accordingly, such computer programs represent controllers of the computer system 1000.

In an aspect of the present disclosures where the method is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The detailed description set forth above in connection with the appended drawings describes example embodiments and does not represent all the embodiments that may be implemented or that are within the scope of the claims. The term "exemplary," as used in this description, means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" "one or more of") indicates an inclusive list such that, for example, a list of at least one of A, B, or C means A or B or C or AB or AC or BC or ABC (i.e., A and B and C).

le;2qComputer-readable media includes both computer storage media and communication media including any medium that facilitates transfer of a computer program from one place to another. A storage medium may be any available medium that can be accessed by a general purpose or special purpose computer. By way of example, and not limitation, computer-readable media may comprise RAM, ROM, electrically erasable programmable read only memory (EEPROM), compact disk (CD) ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of controlling access to an access-controlled point, comprising:
   generating a random string or pseudorandom string;
   acoustically broadcasting a beacon message comprising the random string or pseudorandom string;
   acoustically receiving, in response to acoustically broadcasting the beacon message, an authentication message comprising a user identification and an authentication string;
   obtaining a password associated with the user identification;
   computing a verification string using the password and the random string or pseudorandom string;
   verifying the authentication string in the authentication message using the verification string; and
   transmitting, in response to successfully verifying the authentication string in the authentication message, an unlocking message to the access controlled point to unlock the access controlled point.

2. The method of claim 1, further comprising, prior to broadcasting the beacon message, acoustically modulating the beacon message.

3. The method of claim 2, wherein the acoustically modulating comprises frequency modulating the beacon message or amplitude modulating the beacon message.

4. The method of claim 1, further comprising acoustically demodulating the authentication message.

5. The method of claim 4, wherein the demodulating comprises frequency demodulating the authentication message or amplitude demodulating the authentication message.

6. The method of claim 1, wherein the verifying comprises: comparing the authentication string to the verification string to determine whether the authentication string is identical to the verification string.

7. The method of claim 1, wherein the computing comprises performing a hash function on the password and the random string or pseudorandom string to generate the verification string.

8. An access control device, comprising:
   a microphone configured to receive audio input;
   a speaker configured to emit audio output;
   a memory comprising instructions; and
   a processor communicatively coupled with the memory, the processor being configured to execute the instructions to:
      generate a random string or pseudorandom string;
      cause the speaker to acoustically broadcast a beacon message comprising the random string or pseudorandom string;
      cause the microphone to acoustically receive, in response to acoustically broadcasting the beacon message, an authentication message comprising a user identification and an authentication string;
      obtain a password associated with the user identification;
      compute a verification string using the password and the random string or pseudorandom string;
      verify the authentication string in the authentication message using the verification string; and
      transmit, in response to successfully verifying the authentication string in the authentication message, an unlocking message to an access controlled point to unlock the access controlled point.

9. The access control device of claim 8, wherein the processor is further configured to, prior to broadcasting the beacon message, acoustically modulate the beacon message.

10. The access control device of claim 9, wherein the acoustically modulating comprises frequency modulating the beacon message or amplitude modulating the beacon message.

11. The access control device of claim 8, wherein the processor is further configured to acoustically demodulate the authentication message.

12. The access control device of claim 11, wherein the demodulating comprises frequency demodulating the authentication message or amplitude demodulating the authentication message.

13. The access control device of claim 8, wherein the verifying comprises comparing the authentication string to the verification string to determine whether the authentication string is identical to the verification string.

14. The access control device of claim 8, wherein the computing comprises performing a hash function on the password and the random string or pseudorandom string to generate the verification string.

15. A non-transitory computer readable medium comprising instructions that, when executed by a processor, cause the processor to:
   generate a random string or pseudorandom string;
   cause a speaker to acoustically broadcast a beacon message comprising the random string or pseudorandom string;
   cause a microphone to acoustically receive, in response to acoustically broadcasting the beacon message, an authentication message comprising a user identification and an authentication string;
   obtain a password associated with the user identification;
   compute a verification string using the password and the random string or pseudorandom string;
   verify the authentication string in the authentication message using the verification string; and
   transmit, in response to successfully verifying the authentication string in the authentication message, an unlocking message to an access controlled point to unlock the access controlled point.

16. The non-transitory computer readable medium of claim 15, further comprises instructions that, when executed by the processor, cause the processor, prior to broadcasting the beacon message, acoustically modulate the beacon message.

17. The non-transitory computer readable medium of claim 16, wherein the acoustically modulating comprises frequency modulating the beacon message or amplitude modulating the beacon message.

18. The non-transitory computer readable medium of claim 15, further comprises instructions that, when executed by the processor, cause the processor to acoustically demodulate the authentication message.

19. The non-transitory computer readable medium of claim 18, wherein the demodulating comprises frequency demodulating the authentication message or amplitude demodulating the authentication message.

20. The non-transitory computer readable medium of claim 15, wherein the instructions for computing further comprises instructions that, when executed by the processor, cause the processor to perform a hash function on the password and the random string or pseudorandom string to generate the verification string.

* * * * *